(12) United States Patent
O'Dwyer (10) Patent No.: US 6,860,187 B2
(45) Date of Patent: Mar. 1, 2005

(54) PROJECTILE LAUNCHING APPARATUS AND METHODS FOR FIRE FIGHTING

(75) Inventor: James Michael O'Dwyer, Brisbane (AU)

(73) Assignee: Metal Storm Limited, Brisbane (AU)

( * ) Notice: Subject to any disclaimer, the term of this patent is extended or adjusted under 35 U.S.C. 154(b) by 0 days.

(21) Appl. No.: 10/188,862

(22) Filed: Jul. 5, 2002

(65) Prior Publication Data

US 2003/0010185 A1 Jan. 16, 2003

Related U.S. Application Data (63) Continuation-in-part of application No. 09/958,466, filed as application No. PCT/AU00/00296 on Apr. 7, 2000, now Pat. No. 6,701,818.

(30) Foreign Application Priority Data

Jul. 6, 2001 (AU) .............................................. PR6197

(51) Int. Cl.[7] .................................................. F41F 1/08
(52) U.S. Cl. .......................... 89/127; 89/1.41; 102/438; 102/370; 102/520
(58) Field of Search ......................... 89/126, 127, 1.41; 181/116–118; 175/4.55; 102/438, 370, 520–523, 367

(56) References Cited

U.S. PATENT DOCUMENTS

| 338,762 | A | * | 3/1886 | Moore |
| 3,967,553 | A | * | 7/1976 | Keraus et al. |
| 3,980,139 | A | * | 9/1976 | Kirk .............................. 169/28 |
| 4,696,347 | A | | 9/1987 | Stolov et al. .................. 169/46 |
| 4,964,469 | A | | 10/1990 | Smith ........................... 169/28 |
| 5,883,329 | A | | 3/1999 | O'Dwyer .................... 102/217 |
| 6,123,007 | A | | 9/2000 | O'Dwyer ..................... 89/135 |
| 6,138,395 | A | | 10/2000 | O'Dwyer ........................ 42/84 |
| 6,223,642 | B1 | | 5/2001 | O'Dwyer .......................... 89/7 |
| 6,301,819 | B1 | | 10/2001 | O'Dwyer ........................ 42/84 |

FOREIGN PATENT DOCUMENTS

| AU | 63753/80 | | 7/1986 |
| DE | 25 18 918 | | 11/1976 |
| DE | 29708251 | | 7/1997 |
| EP | 0 320 554 | | 6/1989 |
| EP | 0 412209 A1 | | 2/1991 |
| FR | 1 473621 A | | 3/1967 |
| FR | 2 624 962 | | 6/1989 |
| GB | 1385277 | | 2/1975 |
| JP | 09051957 | | 2/1997 |
| WO | WO94/20809 | | 9/1994 |
| WO | WO 94/21981 | * | 9/1994 |
| WO | WO97/04281 | | 2/1997 |
| WO | WO 98/17962 | | 4/1998 |
| WO | WO98/55824 | | 12/1998 |
| WO | WO00/62004 | | 10/2000 |
| WO | WO01/87421 | | 11/2001 |

OTHER PUBLICATIONS

Patent Abstract of SU 1132–270A, Soviet Union, Published Dec. 30, 1984, 1 page.
Patent Abstract of JP 08280834–A, Japan, Published Apr. 12, 1995., 1 page.

* cited by examiner

*Primary Examiner*—Stephen M. Johnson
(74) *Attorney, Agent, or Firm*—Finnegan, Henderson, Farabow, Garrett & Dunner, L.L.P.

(57) ABSTRACT

A method of target specific fire fighting including the steps of providing a barrel assembly, suitably in a pod, which is capable of firing a plurality of projectiles. Each projectile having containment for matter or objects to be delivered to a target fire; loading the containments with matter or objects comprising fire retardants, dousing or extinguishing means; providing control means for aiming and controlling the rate of fire of projectiles and/or quantity of the projectiles fired; and firing the projectiles in a controlled manner from a remote location toward the fire so as to douse or extinguish the fire. The barrel assemblies of the projectile launching apparatus are of the type having a plurality projectiles arranged in-line within a barrel and associated with discrete selectively ignitable propellant charges for propelling the projectiles sequentially through the muzzle of the barrel.

21 Claims, 7 Drawing Sheets

PROJECTILE LAUNCHING APPARATUS AND METHODS FOR FIRE FIGHTING

CROSS REFERENCE TO RELATED APPLICATIONS

This application is a continuation-in-part of U.S. patent application Ser. No. 09/958,466 now U.S. Pat. No. 6,701,818 which was filed from PCT International Patent Application No. PCT/AU00/00296 dated Apr. 7, 2000 and published in English on Oct. 19, 2000.

BACKGROUND OF THE INVENTION

1. Technical Field

This invention relates to methods of and apparatus for delivering loaded projectiles for civilian purposes.

The civilian purposes which may be embraced by this invention include, but are not limited to:

seismic exploration utilising explosive signal generators in the form of projectiles launched from a site remote from the location to be explored;

target specific fire fighting utilising projectiles containing fire retardant;

launching projectiles containing matter or objects to be delivered rapidly to a site remote from the launch site, such as difficult to access sites for subsequent retrieval from a containment part of the projectile, and launching projectiles containing matter to be dispersed from the a projectile in flight above a target zone, such as dispersal of fire retardants or insecticides or other treatment.

This invention has particular application to launching projectiles from a barrel having a plurality of projectiles axially disposed within the barrel and which projectiles are associated with discrete selectively ignitable propellant charges for propelling the projectiles sequentially through the muzzle of the barrel. Sealing engagement is provided between projectiles and barrel so as to prevent rearward travel of an ignited propellant charge to the trailing propellant charge. Such barrel assemblies will be referred to hereinafter as of the type described. Such barrel assemblies are illustrated in earlier International Patent Applications by the present inventor.

2. Discussion of the Background Art

Seismic exploration of the earth's strata is extensively used in oil prospecting, as well as for site investigation in building large scale structures and other civil engineering projects such as for determination of depth to bedrock, delineation of sand and gravel deposits and detection of water-bearing fracture zones and the like in land and marine operations.

The principles of seismic methods of geophysical exploration or mapping are well known. Initially explosive charges were placed to initiate shock waves in the earth's crust. In order to provide appropriate signals a plurality of spaced apart subterranean charges were utilised. While this method is effective the cost of drilling and placement of the charges, mostly in remote areas, is extremely high. On-surface charges have also been trailed, however this did not result in the formation of an effective signal.

In more recent times most seismic exploration has been carried out using a VIBROSEIS type method in which vehicle mounted mechanical vibration apparatus is utilised to instigate the necessary subterranean shock waves. The mechanical vibrating source introduces a definite band of frequencies into the earth. Because of the physical constraints placed on a large vibrating body it is understood that the disturbance produced is in the form of an oscillatory pulse of finite duration in which the frequency changes, substantially linearly with time.

Such systems may have means to vary the frequency of vibration and amplitude of the pulse but such variations are also limited by the mechanical constraints of the particular equipment utilised. The duration of a typical seismic pulse will generally not exceed a few seconds with frequencies within a frequency range between 15 Hz and 90 Hz and with increasing amplitude of the pulse during the event.

Use of these methods is limited to vehicle accessible areas. However seismic signals are provided which enable a more detailed interpretation of the earth's strata to be achieved than is achieved using explosive detonation to generate the seismic signal. However this method is difficult to employ in remote areas and its cost of utilisation in such remote areas is high. There are also significant constraints on the signal type which may be generated, especially utilising mechanical vibration apparatus which of necessity must be by extremely large machines.

In marine operations, the most widely used method of generating seismic signals is to use an air-gun which discharges highly compressed air into the water.

Target specific fire fighting, such as remote fighting a fire in an office of a high rise building has typically been performed by directing a water stream or fire retardant from an elevated platform supported by an extendable ladder. This has limitations imposed by the time required to target the fire and the ability to closely position a nozzle to direct and supply the water or retardant to the site of the fire. Many high rise buildings are simply too high to be reached by ladders.

Fires which extend over a large expanse, either in two dimensions such as a grass fire or three dimensions such as in a bush or forest fire, present particular problems in regard to delivering fire retardant or dousing materials quickly and precisely over threatened areas, whilst minimising risks for fire fighters. Conventional fire fighting techniques typically involve controlling progress of an expansive fire at a perimeter, which may involve back burning. Back burning operations also involve inherent risk, especially in the case of a change in the direction of prevailing winds.

Limitations in delivery of other matter to remote sites are generally well understood.

SUMMARY OF THE INVENTION

Object of the Invention

This invention aims, in one aspect, to alleviate at least one or more of the difficulties associated with presently available delivery or placement methods.

In another aspect, the invention aims to provide improved methods and apparatus for fire fighting, including but not limited to fires having a relatively large two or three dimensional expanse.

Disclosure of the Invention

With the foregoing in view, this invention in one aspect resides broadly in a method of target specific fire fighting, including:

providing a barrel assembly of the type described which is capable of firing a plurality of projectiles each having containment for fire retardants, dousing or extinguishing means;

providing control means for aiming and controlling the rate of fire of projectiles and/or quantity of the projectiles fired, and firing the projectiles in a controlled manner from a remote location toward the fire so as to douse the fire.

Suitably the barrel assembly is one of a plurality of barrel assemblies supported on a vehicle. The vehicle may be provided with aiming means such as a laser sight which provides a visual indication of the aim. Alternatively in a city environment for example the vehicle may be equipped or have instant access to electronically stored topographical information of the built landscape and be equipped with electronic navigation means or the like such that, for example, a room on fire having an exterior window in a certain floor of a multistorey building may be targeted by parking the vehicle nearby, and suitably within line of sight of the target, and entering in the stored reference for that window.

The control means may permit a test firing of a non-active projectile preliminary to firing a desired volley of active projectiles for dousing the blaze. The control means may control the rate of fire and/or direction of selected or each barrel assembly. The vehicle may contain pods of barrels each loaded with projectiles adapted for treating specific fire types, such as an electrical fire or a chemical fire and the control means may permit firing only the appropriate barrels or sequence of loaded barrel types to achieve the desired result.

We have also found a method of fire fighting that permits an expanse of fire to be, substantially simultaneously, doused with a fire retardant thereby making the fire easier to contain and ultimately to completely extinguish.

Accordingly there is provided another method of fire fighting wherein said method includes identifying an target area to be doused with fire retardant and discharging a multiplicity of projectiles having the fire retardant contained therein from an ordinance having at least one barrel assembly, said at least one barrel assembly having a barrel, a plurality of projectiles axially disposed within the barrel for operative sealing engagement with the bore of the barrel, and discrete propellant charges for propelling respective projectiles sequentially through the muzzle of the barrel whereby said fire retardant is dispersed over the target area.

In another aspect there is provided a fire fighting apparatus including a targeting system for identifying a target area to be doused with fire retardant and an ordinance for discharging a multiplicity of projectiles having the fire retardant contained therein from said ordinance wherein said ordinance includes at least one barrel assembly, said at least one barrel assembly having a barrel, a plurality of projectiles axially disposed within the barrel for operative sealing engagement with the bore of the barrel, and discrete propellant charges for propelling respective projectiles sequentially through the muzzle of the barrel whereby said fire retardant is dispersed over the target area.

It has been found that by dousing "hot spots" in a fire the intensity of the fire may be reduced. Thus conventional fire fighting techniques may be made more effective. Advantageously infra-red targeting systems may be used in the present invention to assist in identifying and targeting "hot spots" or other selected locations within a fire. Alternatively visual identification of a target area may be utilised.

The target area may be selected as a "hot spot" as described above. Alternatively the target area may be selected to assist in protecting people or property from fire. For example, in order to assist fire fighters or victims trapped by fire to escape from danger, a target area in the form of a corridor or escape route may be identified.

The type of fire retardant that may be deployed in the method of the present invention includes a wide variety of fire retardants. Fire retardants are generally classified as types A. B or C and may be used on fires that burn on different fuel sources. The method of the present invention may deploy a powder retardant that is suitable on all classes of fire. Alternatively, a multiplicity of barrel assemblies may be used to selectively fire a variety of fire retardants that may be selected to suit the particular fire.

The ordinance includes a number of barrel assemblies including a barrel; a plurality of projectiles axially disposed within the barrel for operative sealing engagement with the bore of the barrel, and discrete propellant charges for propelling respective projectiles sequentially through the muzzle of the barrel discharge projectiles to douse the fire. Such barrel assemblies are described in our earlier International Patent Application Nos. PCT/AU94/00124, PCT/AU96/00459 and PCT/AU97/00713.

The projectile may be round, conventionally shaped or dart-like and the fins thereof may be offset to generate a stabilising spin as the dart is propelled from a barrel that may be a smooth-bored barrel.

The projectile charge may be form as a solid block to operatively space the projectiles in the barrel or the propellant charge may be encased in metal or other rigid case which may include an embedded primer having external contact means adapted for contacting an pre-positioned electrical contact associated with the barrel. For example the primer could be provided with a sprung contact which may be retracted to enable insertion of the cased charge into the barrel and to spring out into a barrel aperture upon alignment with that aperture for operative contact with its mating barrel contact. If desired the outer case may be consumable or may chemically assist the propellant burn. Furthermore an assembly of stacked and bonded or separate cased charges and projectiles may be provide for reloading a barrel.

Each projectile may include a projectile head and extension means for at least partly defining a propellant space. The extension means may include a spacer assembly that extends rearwardly from the projectile head and abuts an adjacent projectile assembly.

The spacer assembly may extend through the propellant space and the projectile head whereby compressive loads are transmitted directly through abutting adjacent spacer assemblies. In such configurations, the spacer assembly may add support to the extension means which may be a thin cylindrical rear portion of the projectile head. Furthermore the extension means may form an operative sealing contact with the bore of the barrel to prevent burn leakage past the projectile head.

The spacer assembly may include a rigid collar which extends outwardly to engage a thin cylindrical rear portion of the malleable projectile head inoperative sealing contact with the bore of the barrel such that axially compressive loads are transmitted directly between spacer assemblies thereby avoiding deformation of the malleable projectile head.

Complementary wedging surfaces may be disposed on the spacer assembly and projectile head respectively whereby the projectile head is urged into engagement with the bore of the barrel in response to relative axial compression between the spacer means and the projectile head. In such arrangement the projectile head and spacer assembly may be loaded into the barrel and there after an axial displacement is caused to ensure good sealing between the projectile head and barrel. Suitably the extension means is urged into engagement with the bore of the barrel.

The projectile head may define a tapered aperture at its rearward end into which is received a complementary tapered spigot disposed on the leading end of the spacer assembly, wherein relative axial movement between the projectile head and the complementary tapered spigot causes a radially expanding force to be applied to the projectile head.

The barrel may be non-metallic and the bore of the barrel may include recesses that may fully or partly accommodate the ignition means. In this configuration the barrel houses electrical conductors which facilitate electrical communication between the control means and ignition means. This configuration may be utilised for disposable barrel assemblies that have a limited firing life and the ignition means and control wire or wires therefor can be integrally manufactured with the barrel.

A barrel assembly may alternatively include ignition apertures in the barrel and the ignition means are disposed outside the barrel and adjacent the apertures. A non-metallic outer barrel that may include recesses adapted to accommodate the ignition means may surround the barrel. The outer barrel may also house electrical conductors that facilitate electrical communication between the control means and ignition means. The outer barrel may be formed as a laminated plastics barrel which may include a printed circuit laminate for the ignition means.

The barrel assembly may have adjacent projectiles that are separated from one another and maintained in spaced apart relationship by locating means separate from the projectiles, and each projectile may include an expandable sealing means for forming an operative seal with the bore of the barrel. The locating means may be the propellant charge between adjacent projectiles and the sealing means suitably includes a skirt portion on each projectile which expands outwardly when subject to an in-barrel load. The in-barrel load may be applied during installation of the projectiles or after loading such as by tamping to consolidate the column of projectiles and propellant charges or may result from the firing of an outer projectile and particularly the adjacent outer projectile.

The rear end of the projectile may include a skirt about an inwardly reducing recess such as a conical recess or a part-spherical recess or the like into which the propellant charge portion extends and about which rearward movement of the projectile will result in radial expansion of the projectile skirt. This rearward movement may occur by way of compression resulting from a rearward wedging movement of the projectile along the leading portion of the propellant charge it may occur as a result of metal flow from the relatively massive leading part of the projectile to its less massive skirt portion.

Alternatively the projectile may be provided with a rearwardly divergent peripheral sealing flange or collar which is deflected outwardly into sealing engagement with the bore upon rearward movement of the projectile. Furthermore the sealing may be effected by inserting the projectiles into a heated barrel which shrinks onto respective sealing portions of the projectiles. The projectile may comprise a relatively hard mandrel portion located by the propellant charge and which cooperates with a deformable annular portion may be moulded about the mandrel to form a unitary projectile which relies on metal flow between the nose of the projectile and its tail for outward expansion about the mandrel portion into sealing engagement with the bore of the barrel.

The projectile assembly may include a rearwardly expanding anvil surface supporting a sealing collar thereabout and adapted to be radially expanded into sealing engagement with the barrel bore upon forward movement of the projectile through the barrel. In such a configuration it is preferred that the propellant charge have a cylindrical leading portion which abuts the flat end face of the projectile.

The projectiles may be adapted for seating and/or location within circumferential grooves or by annular ribs in the bore or in rifling grooves in the bore and may include a metal jacket encasing at least the outer end portion of the projectile. The projectile may be provided with contractible peripheral locating rings that extend outwardly into annular grooves in the barrel and that retract into the projectile upon firing to permit its free passage through the barrel.

The electrical ignition for sequentially igniting the propellant charges of a barrel assembly may preferably include the steps of igniting the leading propellant charge by sending an ignition signal through the stacked projectiles, and causing ignition of the leading propellant charge to arm the next propellant charge for actuation by the next ignition signal. Suitably all propellant charges inwardly from the end of a loaded barrel are disarmed by the insertion of respective insulating ruses disposed between normally closed electrical contacts.

Ignition of the propellant may be achieved electrically or ignition may utilise conventional firing pin type methods such as by using a centre-fire primer igniting the outermost projectile and controlled consequent ignition causing sequential ignition of the propellant charge of subsequent rounds. This may be achieved by controlled rearward leakage of combustion gases or controlled burning of fuse columns extending through the projectiles.

In another form the ignition is electronically controlled with respective propellant charges being associated with primers which are triggered by distinctive ignition signals. For example the primers in the stacked propellant charges may be sequenced for increasing pulse width ignition requirements whereby electronic controls may selectively send ignition pulses of increasing pulse widths to ignite the propellant charges sequentially in a selected time order. preferably however the propellant charges are ignited by a set pulse width signal and burning of the leading propellant charge arms the next propellant charge for actuation by the next emitted pulse.

Suitably in such embodiments all propellant charges inwardly from the end of a loaded barrel are disarmed by the insertion of respective insulating fuses disposed between insertion of respective insulating fuses disposed between normally closed electrical contacts, the fuses being set to burn to enable the contacts to close upon transmission of a suitable triggering signal and each insulating fuse being open to a respective leading propellant charge for ignition thereby.

A number of projectiles can be fired simultaneously, or in quick succession, or in response to repetitive manual actuation of a trigger, for example. In such arrangements the electrical signal may be carried externally of the barrel or it may be carried through the superimposed projectiles which may clip on to one another to continue the electrical circuit through the barrel, or abut in electrical contact with one another. The projectiles may carry the control circuit or they may form a circuit with the barrel.

The fire fighting capabilities of the method and apparatus of the present invention may advantageously be applied to fighting fires in a relatively flat, two-dimensional plane. The projectiles containing fire retardant may be detonated to disperse the fire retardant in a simple plane. For example, the surface of the fuel source which feeds grass fires, and spilled fuel fires is generally a rather flat two dimensional plane which is often horizontal. These fires can be effectively engaged by the mortar box means of distributing impact activated 'grenades' that release fire retardant powder. Although grass and brush may have a vertical fuel depth of say two meters, such a depth can generally be expected to be doused with fire retardant by the normal distribution effect of impact bursting grenades.

It may be preferable to burst the grenades and disperse the fire retardant above the plane of the fire. This may be done by the use of a laser device or the like which might be attached to a truck, or which could operate separately or in a hand held manner. The purpose of the laser signal would be to broadcast a horizontal or otherwise preferred shaped signal above the fire, to be received by a the grenades and to initiate the timing of the release of the powder. In this way all of the grenades would burst at a designated height above the fire, and thereby more effectively douse the flames with fire retardant that may settle onto the source of the fire. The projectiles may burst and deploy the fire retardant by use of a small explosive charge. Alternatively a mechanical assembly may be used to deploy the fire retardant.

The grenades may be stacked in a mortar box to have a range of response times so that a calculated percentage of them burst at the time the signal is received, while others burst at a number of delayed times. The result of which may be that some grenades burst above the flames, some burst in the flames and in the case of tall grass and brush some burst in the fuel column. Others may remain as impact activated grenades. In this way, fuel structures such as branches and the like which might otherwise only be 'dusted' from the top, would also be dusted from below, and the material in vertical fuel column would be more effectively covered.

The grenades may receive signals of when to burst from a variety of other sources, such as radio frequency, and any other suitable means. Additionally the projectiles may be heat activated in that they include means for bursting, in part or in total, initiated by the heat of the fire.

Finned or otherwise controlled projectiles may be fitted with heat sensors, infrared for example, such that projectiles which might otherwise fall outside the fire perimeter, or more than a preferred distance outside the fire perimeter, would autonomously change course to fall inside the desired perimeter.

The method and apparatus of the present invention may also be employed in dousing fires that are burning in a more three dimensional volume. For example forest fires, in which case the vertical fuel column and the resulting flame column can be a considerable height may be attacked in accordance with the present invention. For instance it would not be uncommon for a forest fire to be operating in a vertical fuel column stretching from the floor of the forest to the top of the canopy. The height of this vertical fuel column makes the task of extinguishing the flames much greater than would be the case as described with grass and brush. A far greater number of grenades are required and an effective means of distributing the bursting of the grenades within the fire column is desired. It is preferred that a means of ensuring that the grenades burst at various depths in the column, to provide effective coverage of the column with fire retardant powder is provided.

Preferably the projectiles or grenades may be discharged into such fires from an aircraft. Additionally, in the forest fire/aircraft scenario, GPS may be used to establish the height of the aircraft, the height and contour of the forest floor, and this information can be electronically transferred to the mortars during firing. Radar may also be used to determine the height of the aircraft above the forest floor, and the height of the top of the canopy. This information may be used to provide bursting instructions to the projectiles.

The trajectory of the grenades can be calculated by computer to accommodate wind, altitude, aircraft height and speed, forest floor contour and it may thus be available for an operator in the aircraft to have a VDU screen which can overlay the possible impact footprint of a firing onto an infra-red image of the fire. In this way, and/or where available with visual confirmation of the situation, the operator will be able to commence firing at a preferred moment, and will be able to engage the hottest seat of the flames. Further the present invention may be used to deploy fire retardant as a fire break.

Alternatively, the monitor may permit zones within the designated area to be avoided such that either the quantity of fire retardant deployed is minimised.

The use of autonomous control means and infra-red sensors on the grenades can reduce off-target waste, and more effectively concentrate the powder onto the fire.

In one embodiment, the barrel assemblies may be splayed relative to each other to concentrate or diffuse the fire from the mortar box dependent upon the nature of the fire.

In a further broad aspect this invention resides broadly in a method of rapidly delivering matter or objects to a remote site, including:

providing a barrel assembly of the type described which is capable of firing a plurality of projectiles each having a containment for matter or objects to be delivered to the remote site;

loading the containments with the matter or objects to be delivered;

providing control means for aiming and controlling the rate of fire of projectiles and/or quantity of the projectiles fired, and firing the projectiles in a controlled manner from the barrel assembly to the remote location.

Each containment may contain matter to be dispersed in-flight above the remote location, such as fire retardant or insecticide or other treatment. In such applications the containment may be opened explosively or the containment may contain chemical or mechanical extrusion means for forcing the matter through one or more rupturable openings formed in the wall of the containment.

Alternatively the containment may be adapted to be recovered intact to enable the contents to be recovered. For this purpose the containment may include a cover which is latched or screw connected to the main body of the projectile or otherwise adapted to be opened for recovery of the contents therefrom. Further the projectile may be adapted to deploy a parachute above the target zone for delivery of shock sensitive material from the containment.

The projectiles may be formed of biodegradable material to prevent long term accumulation of refuse at sites to which material is delivered by the method of this invention.

BRIEF DETAILS OF THE DRAWINGS

In order that this invention may be more readily understood and put into practical effect, reference will now be made to the accompanying drawings which illustrate typical embodiments of the invention, wherein.

DESCRIPTION OF PREFERRED EMBODIMENTS

Figure 1:
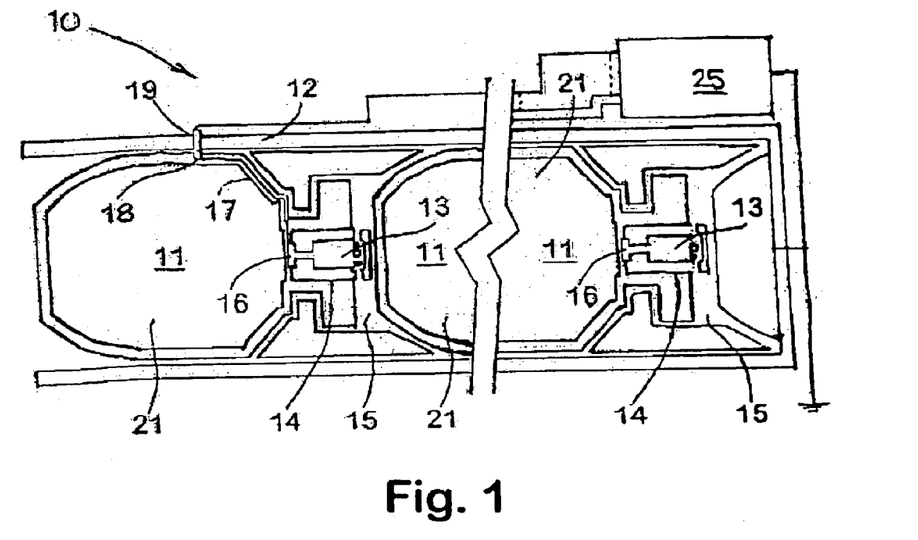
FIG. 1 is a diagrammatic cut-away view illustrating a barrel assembly for launching load carrying projectiles according to one aspect of this invention.

The barrel assembly 10 of one embodiment illustrated in FIG. 1 has multiple load carrying projectiles 11 loaded in a rifled barrel 12 to impart spin upon firing for activating the arming device. Arming of the projectiles for discharge of their load from the containment 21 or activating firing of the explosive material carried thereby can be selected by a spin count method or others means, separately or in combination for additional safety, and commonly used in 40 mm grenades, including a flight-timing device.

In the above embodiment the propellant 13 in each high pressure chamber 14 is adapted to be ignited by electronically controlled ignition to expel high pressure gases through the trailing ports into the low pressure chamber 15 by a detonator 16. The detonators for respective projectiles 11 are triggered by electronic control means 25, such as a computer, through an electrical circuit which uses the projectile column as one part of the circuit. In this embodiment, the barrel 12 is made of insulating material or so lined and with the circuit completed by an imbeded insulated wire 17 leading from the detonator 16 to a contact 18 on the projectile surface which is aligned when loaded, with a complementary contact 19 supported in the barrel 12.

Alignment of the contacts 18, 19 can be achieved in a barrel where the projectile is located by rifling grooves during the loading process. In a non rifled design, the use of a annular contact in the barrel wall can achieve a similar result.

Figure 2:
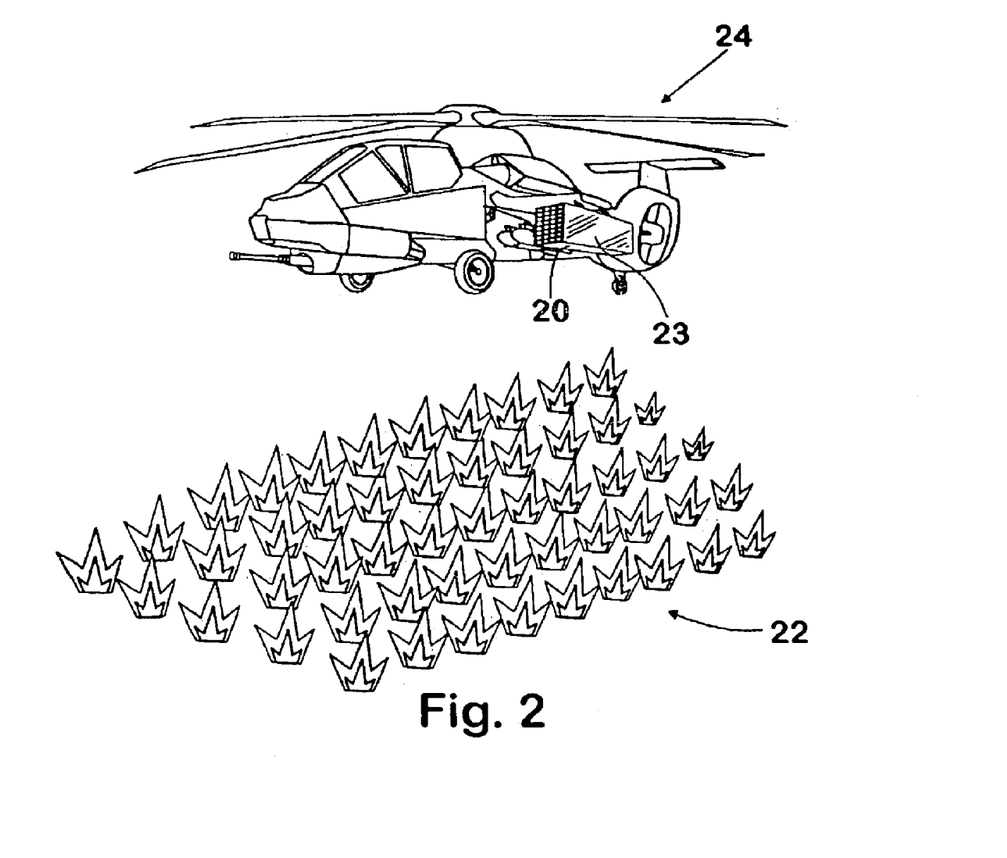
FIG. 2 illustrates a firing arrangement suitable for seismic exploration, for delivery of herbicides or pesticides, or for fighting an expansive fire.

For the purposes of seismic exploration, a cluster of barrel assemblies 20 adapted to launch grenade like projectiles is contained in a pod 23 such that a selected number of near simultaneously exploding grenades, as illustrated at 22, may be fired to the site to be explored to create the seismic signal.

Suitably 40 mm grenades are used as the projectiles because of their ready availability. The grenades are fired selectively by computer control from the pod 23 which is envisaged will contain ninety-eight barrel assemblies each containing stacked grenades and having selectively ignitable internal or external propellant charges. The grenades may be selectively fired to form a controlled impact array of exploding grenades on the zone to be investigated.

By way of example, using such a barrel assembly in a pod of ninety-eight 40 mm barrels that would measure approximately 350 mm×700 mm in cross section, with each barrel loaded with six projectiles, and with each projectile similar in size to a conventional 40 mm military grenade, a barrel length of 900 mm would be required and the assembly would provide a projectile capacity of five hundred and eighty-eight projectiles.

This configuration would be suitable for seismic applications requiring a short range such as for delivering projectiles from downwardly facing barrels. For longer range delivery fewer projectiles would be accommodated in each of such barrels or longer barrels would be used and more propellant would be utilised to achieve higher muzzle exit velocities. Other configuration may be used to suit the particular requirements.

The maximum rate of fire per barrel is expected to be as high as 20,000 projectiles per minute. Therefore, the maximum rate for the combined ninety-eight barrels would be 1,960,000 projectiles per minute, assuming that all barrels are fired simultaneously at the maximum rate.

For a ninety-eight shot burst firing the leading round from each of the ninety-eight barrels, the rate is infinitely variable and which may be a ninety-eight shot burst fired at a rapid frequency.

The above ninety-eight barrel pod is one example of a range of performance specifications that could be available. Different performance specifications can be generated by altering the component parts of the pod. For example, a pod may be preloaded such that the nature and weight of the explosive projectile may vary between individual barrels in the pod.

Figure 7:
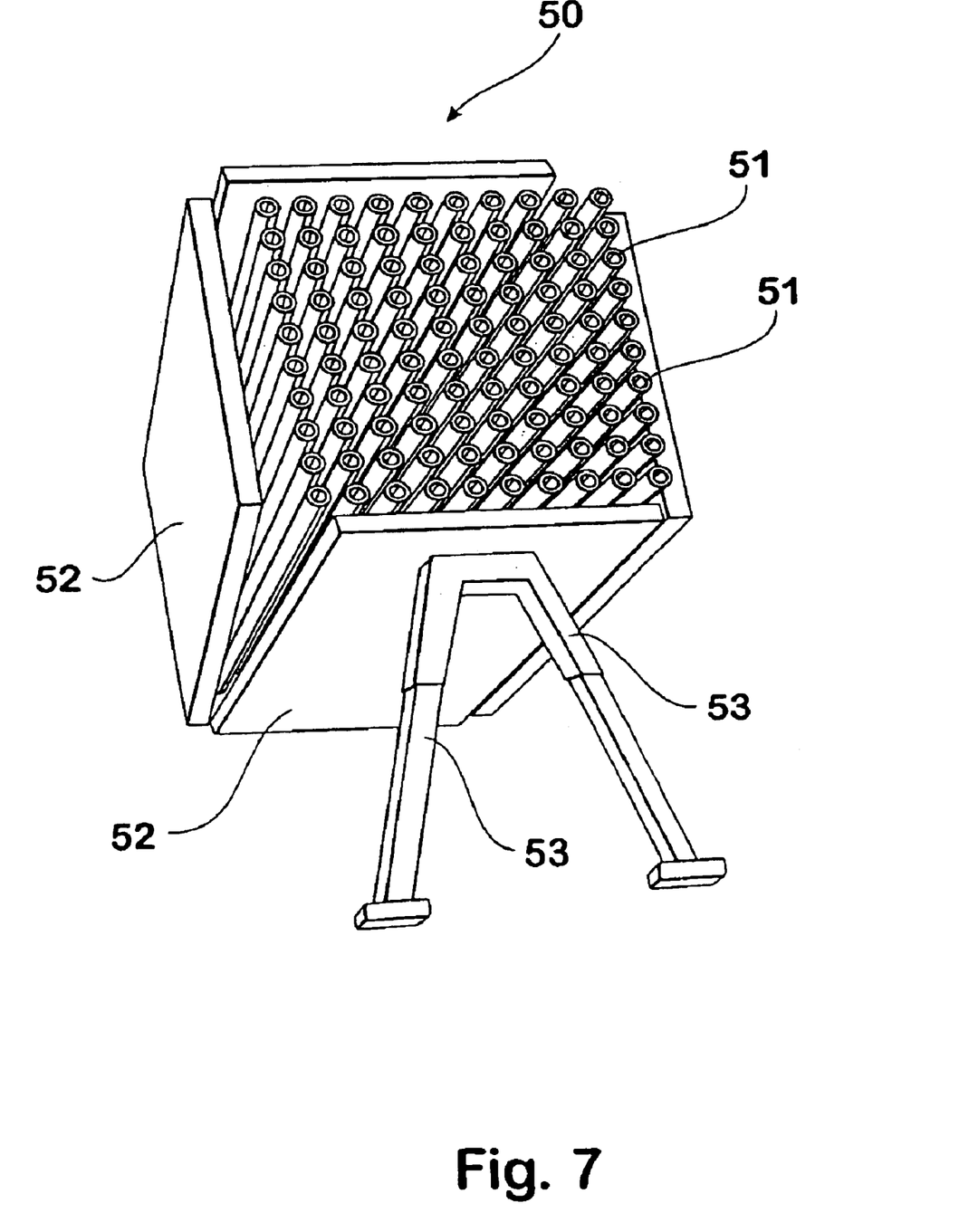
FIG. 7 is a perspective illustration of a mortar box type fire fighting unit for use in the present invention.

In the embodiment illustrated in FIG. 2, the grenades are fired downwardly from a pair of such pods 23, only one of which is shown, carried by a helicopter 24. Alternatively the grenades 22 could be fired from ground based pod, such as depicted in FIG. 7, to impact a safe distance away. The pod could be remotely operated for safety reasons if desired. Conventional recording means would be activated to record the resultant seismic signals for analysis of the strata by known methods.

Figure 3:
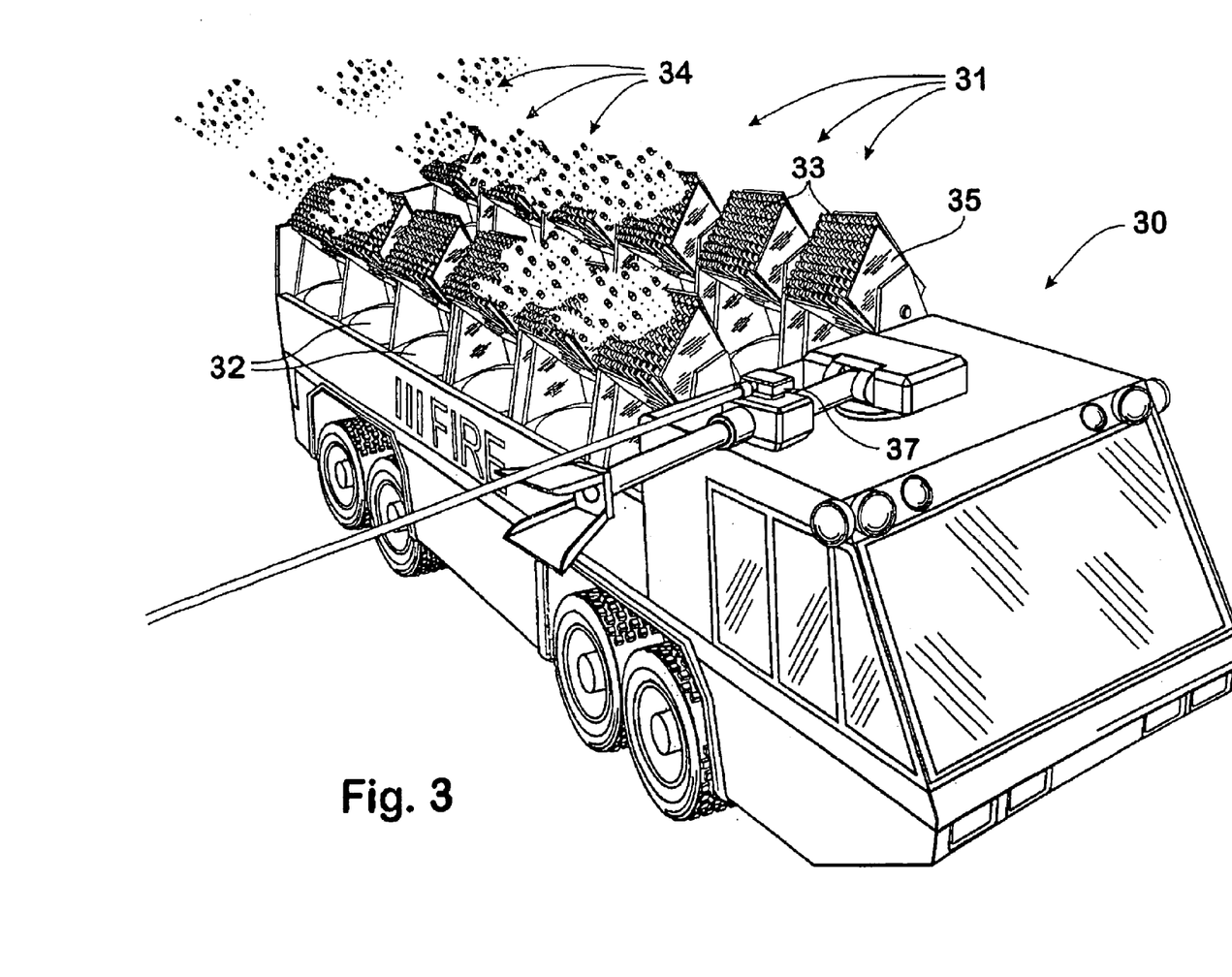
FIG. 3 illustrates a firefighting vehicle according to a further aspect of this invention.
Figure 5:
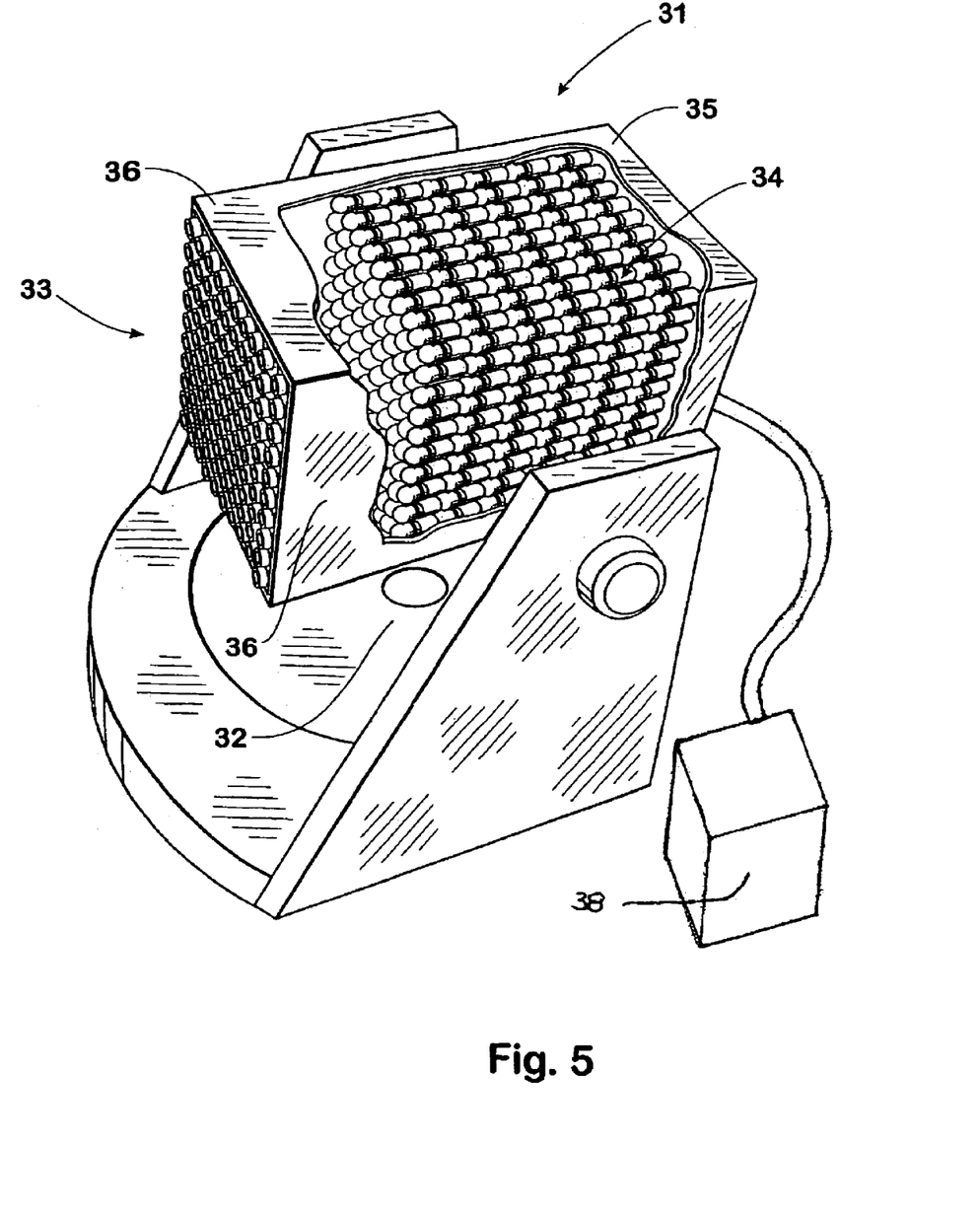
FIG. 5 is a diagrammatic cut-away view illustrating the arrangement of the projectiles in a single pod of barrel assemblies of FIG. 4.

The fire fighting vehicle 30 illustrated in FIG. 3 has banks of pods 31 mounted on turret mountings 32 whereby each pod 31 may be selectively directed toward a desired target. As illustrated in FIG. 5 each pod 31 may contain 100 barrel assemblies 33 of the type described and such as is illustrated in FIG. 1 each loaded with six projectiles 34 having fire retardant in their containment portion 21.

The barrel assemblies 33 are suitably contained within an expandable housing 35 whereby their outer ends 36 may be opened to accommodate the barrel assemblies 33 when disposed in a splayed arrangement, as illustrated in FIG. 3. To achieve splaying a camming plate (not illustrated) may be arranged for movement along the outer end portions of the barrel assemblies 33 which have their inner ends pivotally located in the base wall of the housing 35.

Firing the projectiles 34 from splayed barrel assemblies would result in a more general distribution of the projectiles over the target zone, such as may be required for extinguishing a fire in a crashed jet liner. On the other hand, if the target is a window in a multistorey building the barrel assemblies 33 could be retained in a parallel relationship, as illustrated in FIG. 4, or in a slightly converging relationship and their projectiles 34 could be fired simultaneously in banks as desired for delivering the required treatment directly to the site of the fire.

Figure 4:
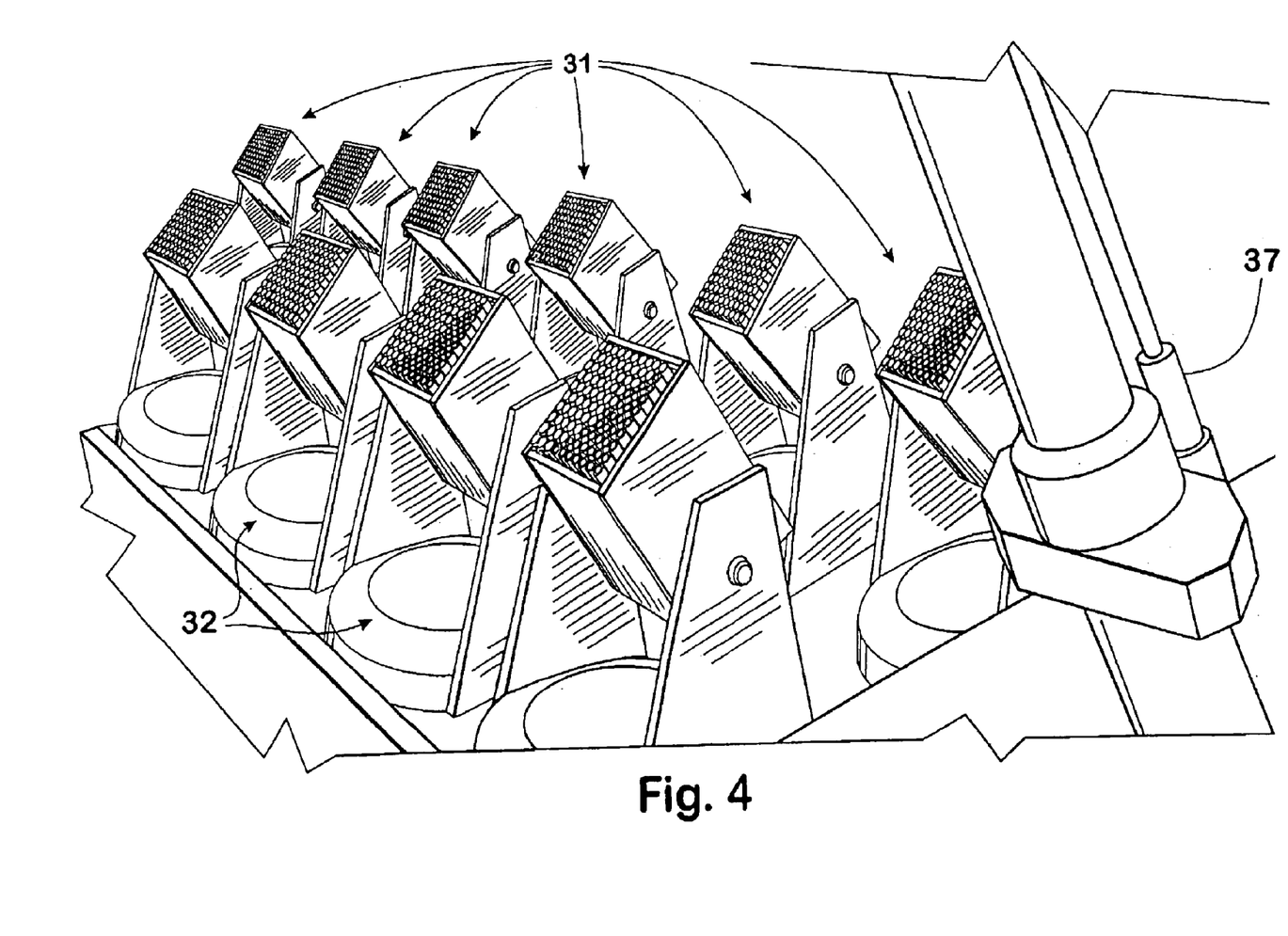
FIG. 4 is an enlarged view illustrating the barrel pods of FIG. 3 in their inoperative travel mode.

In the embodiment illustrated in FIGS. 3 to 5, up to 7,200 projectiles could be delivered from the vehicle 30 into a high rise building in as little as 0.02 seconds. As the pods 31 can be aimed, the vehicle need only be parked proximate the building for emergency delivery of its fire fighting projectiles 34 into the building. The vehicle 30 incorporates a laser aiming system 37 for accurate aiming of the barrel assemblies and a control means 38 for controlling the rate of fire of the projectiles 34 from each barrel assembly in the pod housing 35.

The barrel assemblies, pods of barrel assemblies and their mountings as illustrated in FIGS. 1 to 5 could also be utilised in the other aspects of this invention, utilising the containment portion 21 of each projectile 11 for delivering explosive material for seismic exploration, fire retardant, pyrotechnics, herbicide, pesticide, fertiliser or seed for example.

Figure 6:
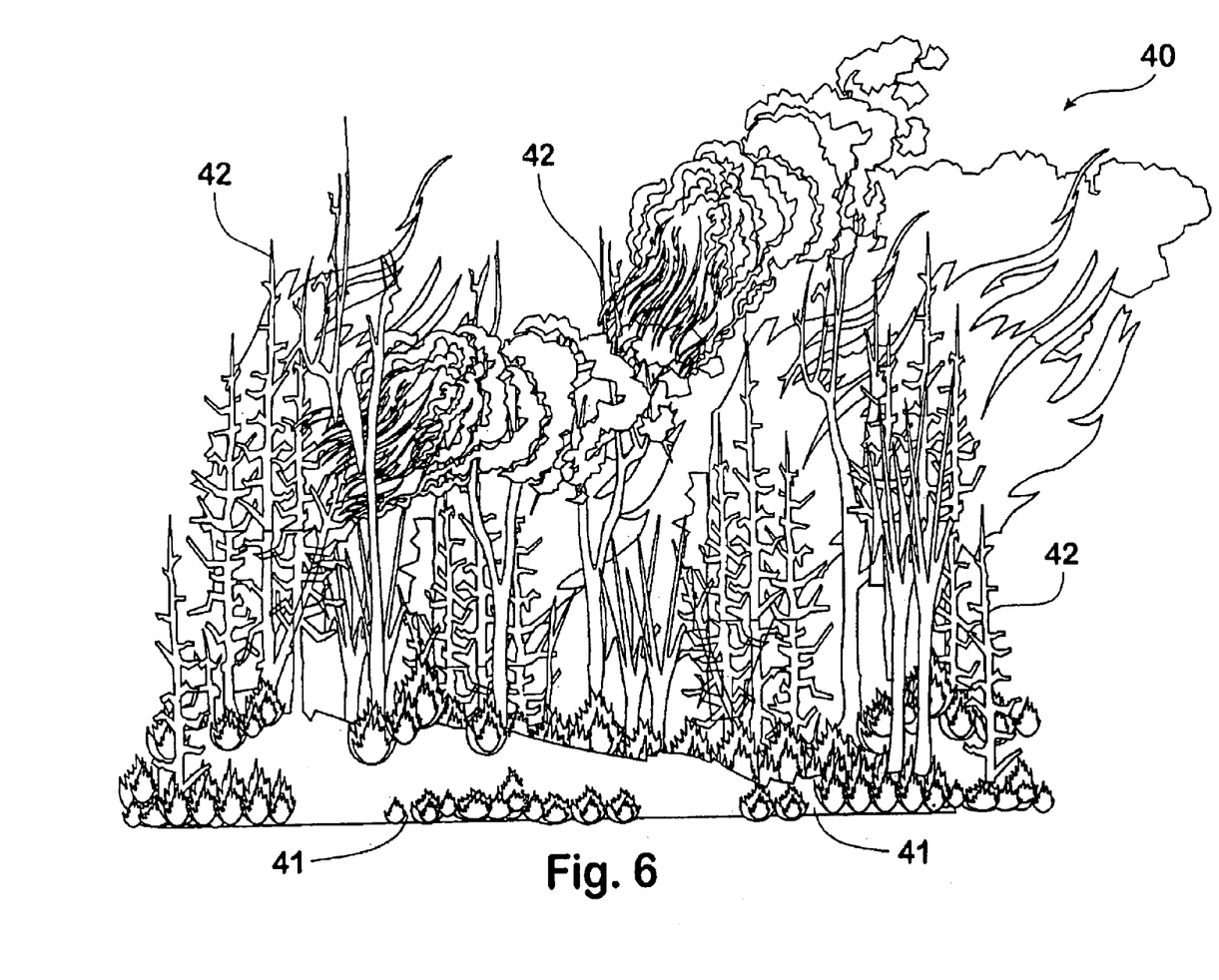
FIG. 6 is a representation of a fire for which a method of another aspect of the invention is applicable.

Turning to FIG. 6, there is shown a bush fire 40 that is burning both on the ground 41 and throughout the fuel column defined by the trees 42. In another embodiment of the present invention the projectiles containing fire retardant are configured to burst and deploy the fire retardant at various heights above the ground and on the ground so as to quench the fire throughout its depth.

Whilst FIG. 3 shows a fire fighting unit in the form of a truck, it should be appreciated that the fire fighting unit may also be airborne such as a fixed wing aircraft or helicopter in an arrangement similar to that depicted in FIG. 2. The fire fighting unit includes a number of pods of barrel assemblies for firing projectiles carrying fire retardant. The fire fighting unit may also have a laser guidance system for directing the projectiles containing fire retardant at the fire.

FIG. 7 shows a manually deployable pod 50 or mortar box containing a plurality of barrel assemblies 51 of different sizes having projectiles (not shown) that incorporate a fire retardant. The pod includes expandable walls 52 which are arranged to accommodate the mutual splaying of barrel assemblies 51, and a folding support structure 53 for orientating the barrels in an inclined position. Such a pod 50 may be transported to a site near the fire and manually deployed in the field by a fire fighting team as required.

Figure 8:
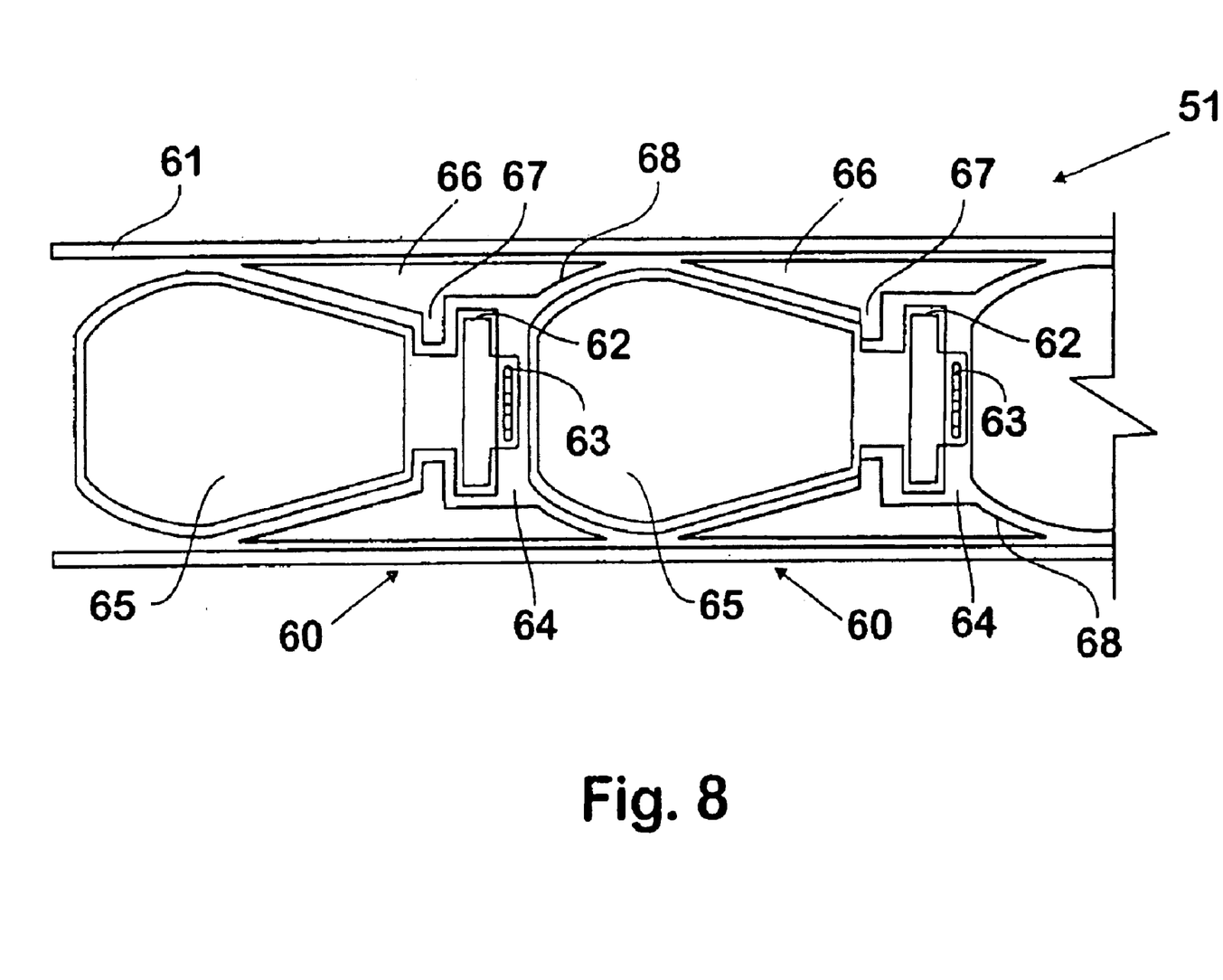
FIG. 8 is a diagrammatic cut-away view illustrating a barrel assembly for launching fire retardant carrying projectiles according to another aspect of this invention.

FIG. 8 shows a typical cross section of projectiles 60 loaded in a barrel 61, such as that comprised in the barrel assemblies 51 of the pod depicted in FIG. 7. The projectiles 60 incorporate fire retardant powder in a containment 65 formed within a head portion and a propellant charge in a high pressure chamber 62 at the projectile tail. Upon ignition, combustion products of the propellant are exhausted through ports 63 into a low pressure chamber 64 to discharge the projectile 60 from the barrel 61.

The projectiles 60 sealably engage the bore of barrel 61 through a tapered sleeve 66 which is retained on the projectile by a shoulder portion 67 of the sleeve. The sleeve 66 extends rearwardly from the projectile head, constituting a spacer assembly for defining the low pressure chamber 64 and abuts and adjacent projectile therebehind. The sleeve 66 includes a wedging surface 68 which engages with a complementary surface on the projectile head, such that when compressive loads are applied to a column of projectiles loaded into the barrel 61, at least a portion of the sleeve 66 may be urged into operative sealing engagement with the bore of the barrel.

It will of course be realised that the above has been given only by way of illustrative example of the invention and that all such modifications and variations thereto as would be apparent to persons skilled in the art are deemed to fall within the broad scope and ambit of the invention as is defined by the following claims.

What is claimed is:

1. A method of target specific fire fighting for controlling a target fire at a remote site, said method including the steps of:

providing a barrel assembly comprising a barrel having a plurality of projectiles arranged in-line within the barrel and associated with discrete selectively ignitable propellant charges for propelling the projectiles sequentially through the muzzle of the barrel, each projectile having a containment for matter or objects to be delivered to the target fire;

loading the containments with matter or objects comprising fire retardants or dousing or extinguishing means;

providing control means for aiming and controlling the rate of fire of projectiles and the quantity of the projectiles fired; and firing the projectiles in a controlled manner toward the remote site in order to control or extinguish the target fire.

2. The method as claimed in claim 1, wherein the barrel assembly is one of a plurality of barrel assemblies supported on a vehicle.

3. The method as claimed in claim 2 wherein the vehicle is provided with aiming means which provides a visual indication of the aim of the barrel assemblies.

4. The method as claimed in claim 2, wherein the control means has access to electronically stored topographical information about landscape features proximate to the target fire for precise aiming of the barrel assemblies.

5. The method as claimed in claim 2 wherein the vehicle carries pods of barrel assemblies, at least some of the pods having projectiles loaded with matter or objects specifically adapted for treating specific fire types.

6. The method as claimed in claim 5 wherein the control means permits firing only the appropriate barrels or sequence of loaded projectile types to douse or extinguish selected fire types.

7. The method as claimed in claim 1 wherein the control means is arranged to permit test firing of a non-active projectile preliminary to firing a desired volley of active projectiles at the target fire.

8. The method as claimed in claim 1 wherein the control means is arranged to control the rate of fire and/or direction of a selected or each barrel assembly.

9. The method as claimed in claim 1 including the further step of opening the containment explosively to effect dispersal of the matter loaded therein.

10. A fire fighting apparatus for fighting a fire having a relatively large area, said apparatus including:

(a) a targeting system for identifying a target area to be doused with fire retardant; and (b) an ordnance for discharging a multiplicity of projectiles having the fire retardant contained therein, wherein said ordnance includes at least one barrel assembly, said at least one barrel assembly having a barrel, a plurality of projectiles axially disposed within the barrel for operative sealing engagement with the bore of the barrel, and discrete propellant charges for propelling respective projectiles sequentially through the muzzle of the barrel, whereby said fire retardant is dispersed over the target area.

11. The fire fighting apparatus of claim 10 wherein the ordnance includes a plurality of barrel assemblies, whereby said multiplicity of projectiles may be discharged simultaneously from respective barrels.

12. The fire fighting apparatus of claim 10 wherein the ordnance comprises at least one pod containing a plurality of barrel assemblies.

13. The fire fighting apparatus of claim 12 wherein said at least one pod is responsive to the targeting system.

14. The fire fighting apparatus of claim 12 wherein the plurality of barrel assemblies are able to be splayed relative to one another so that projectiles may be discharged in a diffuse manner.

15. A method of fighting a fire having a relatively large area, said method including the steps of:
  (a) providing an ordnance having at least one barrel assembly, said at least one barrel assembly having a barrel, a plurality of projectiles containing a fire retardant axially disposed within the barrel for operative sealing engagement with the bore of the barrel, and discrete propellant charges for propelling respective projectiles sequentially through the muzzle of the barrel;
  (b) identifying a target area to be doused with fire retardant: and
  (c) discharging a multiplicity of the projectiles having the fire retardant contained therein from the ordnance whereby said fire retardant is dispersed over the target area.

16. The fire fighting method of claim 15 wherein the ordnance includes a plurality of barrel assemblies and wherein the step of discharging said multiplicity of projectiles occurs simultaneously from respective barrels.

17. The fire fighting method of claim 15, wherein the discharging step further includes the step of activating bursting means in each projectile for opening a containment therein holding said fire retardant.

18. The fire fighting method of claim 17 wherein said bursting means is activated upon impact, whereby the fire retardant may be dispersed from ground level.

19. The fire fighting method of claim 17 wherein said bursting means is activated upon receipt of a signal broadcast to the projectiles, whereby the fire retardant may be dispersed at a designated height above ground level.

20. The fire fighting method of claim 17 wherein the step of discharging projectiles includes the further step of activating said bursting means at different predetermined delays, whereby the fire retardant may be dispersed at a plurality of heights above ground level.

21. A projectile launching apparatus for rapidly delivering matter or objects to a target fire at a remote site, said apparatus including:
  a barrel assembly comprising a barrel having a plurality of projectiles arranged in-line within the barrel and associated with discrete selectively ignitable propellant charges for propelling the projectiles sequentially through the muzzle of the barrel, which barrel assembly is capable of firing a plurality of projectiles each having a containment for matter or objects to be delivered to the remote site; and
  a control means for aiming and controlling the rate of fire of projectiles and the quantity of the projectiles fired, whereby the contaminants of said projectiles are loaded with matter or objects comprising fire retardants, dousing or extinguishing means and said Projectiles may be fired in a controlled manner toward the target fire.

* * * * *

UNITED STATES PATENT AND TRADEMARK OFFICE
CERTIFICATE OF CORRECTION

PATENT NO. : 6,860,187 B2
DATED : March 1, 2005
INVENTOR(S) : O'Dwyer

It is certified that error appears in the above-identified patent and that said Letters Patent is hereby corrected as shown below:

Title page,
Item [30], Foreign Application Priority Data, insert
-- Apr. 7, 1999 (AU) ………………….. PP 9612 --.

Column 14,
Line 25, "Projectiles" should read -- projectiles --.

Signed and Sealed this

Seventeenth Day of May, 2005

JON W. DUDAS
*Director of the United States Patent and Trademark Office*